(12) United States Patent
Inoue

(10) Patent No.: US 6,618,586 B2
(45) Date of Patent: *Sep. 9, 2003

(54) DEVICE AND METHOD FOR SEARCHING DIRECTORY MEMORY OF PORTABLE CELLULAR PHONE

(75) Inventor: Jiro Inoue, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,694

(22) Filed: Feb. 12, 1999

(65) Prior Publication Data

US 2001/0053690 A1 Dec. 20, 2001

(30) Foreign Application Priority Data

Feb. 12, 1998 (JP) .......................... 10-029729

(51) Int. Cl.$^7$ ................................. H04M 3/42
(52) U.S. Cl. ................. 455/415; 455/566; 455/564; 379/354; 379/355.02; 379/142.04
(58) Field of Search ................. 455/414, 415, 455/506, 564; 379/354, 355, 356, 142, 142.04, 355.01, 355.02

(56) References Cited

U.S. PATENT DOCUMENTS

| 4,924,496 A | * | 5/1990 | Figa et al. .................. 379/142 |
| 5,251,250 A | | 10/1993 | Obata et al. |
| 6,005,927 A | * | 12/1999 | Rahrer et al. ................ 455/415 |

FOREIGN PATENT DOCUMENTS

| DE | 40 16 188 A 1 | 11/1991 |
| DE | 196 18 948 A1 | 1/1997 |
| EP | 0 439 065 A2 | 7/1991 |
| EP | 0 458 563 A2 | 11/1991 |
| GB | 2 251 764 A | 7/1992 |
| JP | 64-65963 | 3/1989 |
| JP | 9-64977 | 3/1997 |

* cited by examiner

Primary Examiner—Dwayne Bost
Assistant Examiner—James K Moore
(74) Attorney, Agent, or Firm—Scully, Scott, Murphy & Presser

(57) ABSTRACT

A portable cellular phone comprises a radio communication section, an operation section, a directory memory, a telephone number temporary memory, a control section, and a display section. The radio communication section executes radio communication with a base station. The operation section lets the user input instructions for operating the portable cellular phone. The directory memory stores a plurality of telephone numbers and data corresponding to each of the telephone numbers. The control section detects a telephone number of a party on reception of a call to the portable cellular phone or on calling from the portable cellular phone. The telephone number temporary memory temporarily stores the telephone number of the party which has been detected by the control section. The control section reads out the telephone number which has been stored in the telephone number temporary memory, searches the directory memory for the telephone number, and judges whether or not the telephone number has already been registered in the directory memory. The display section displays the result of the search and judgment by the control section. The user is released from searching the directory memory and judging whether or not the telephone number of the party has already been registered.

10 Claims, 4 Drawing Sheets

FIG. 4A

REGISTERED

NOT REGISTERED

| NAME | ADDRESS | TELEPHONE NUMBER | ABBREVIATED TELEPHONE NUMBER |
|---|---|---|---|
| NAME 1 | ADDRESS 1 | TELEPHONE NUMBER 1 | ----- |
| NAME 2 | ADDRESS 2 | TELEPHONE NUMBER 2 | 01 |
| NAME 3 | ADDRESS 3 | TELEPHONE NUMBER 3 | 02 |
| NAME 4 | ADDRESS 4 | TELEPHONE NUMBER 4 | ----- |
| NAME 5 | ADDRESS 5 | TELEPHONE NUMBER 5 | 03 |

DEVICE AND METHOD FOR SEARCHING DIRECTORY MEMORY OF PORTABLE CELLULAR PHONE

BACKGROUND OF THE INVENTION

The present invention relates to a portable cellular phone, and in particular, to a device and a method for searching directory memory of a portable cellular phone.

DESCRIPTION OF THE PRIOR ART

Communication terminal devices of there days such as portable cellular phones are generally provided with directory memory for storing a plurality of telephone numbers and corresponding data (names, addresses, etc.), and the user of the device can register and store telephone numbers and corresponding data in the directory memory if necessary by operating number keys etc. of the communication terminal device.

A communication terminal device which can release the user from such number key operation for registering data in the directory memory has been disclosed in Japanese Patent Application Laid-Open No.SHO64-65963. The communication terminal device is aimed at eliminating the need for operation by the user for registration and management of the directory memory.

FIG.1 is a block diagram showing the conventional communication terminal device which has been disclosed in Japanese Patent Application Laid-Open No.SHO64-65963. Referring to FIG. 1, the communication terminal device 20 comprises number keys 24 to be used for inputting telephone numbers etc., a display section 25 for displaying the name of a party (a person on the other end of the line: a calling party or a receiving party) etc., a temporary storage section 21 for storing telephone numbers that has been dialed by the user and the number of times of dialing of each telephone number, an electronic directory memory section 22 for storing data such as names to be displayed corresponding to telephone numbers, a control section 23 which detects a telephone number that has been dialed by the user more than a threshold number of times, acquires data that corresponds to the detected telephone number by searching a directory database 27 on a network 26, and registers the data in the electronic directory memory section 22.

When a telephone number that has not been registered in the electronic directory memory section 22 is dialed by the user using the number keys 24, the telephone number which has directly been inputted by the user is stored in the temporary storage section 21 and the number of times of dialing of the telephone number is also stored in the temporary storage section 21. The control section 23 is activated at a predetermined time interval. The control section 23 compares the number of times of dialing of each telephone number to a predetermined threshold number of times and thereby detects a telephone number that has been dialed by the user more than the threshold number of times, automatically acquires data that corresponds to the detected telephone number (the name, address, occupation, etc. of a subscriber corresponding to the telephone number) by searching the directory database 27 on the network 26, and registers the data in the electronic directory memory section 22.

On the other hand, with respect to "calling number identification presentation", that is, a technique for automatically displaying a telephone number etc. of a calling party on a display section of a telephone set of a receiving party, an exchange (a switch) which can inform the receiving party about the telephone number of the calling party and corresponding data such as the name and address, the company name, etc. has been disclosed in Japanese Patent Application Laid-Open No.HEI9-64977.

The conventional communication terminal device which has been described before can automatically register the telephone number and corresponding data of the receiving party in the electronic directory memory section 22 if the number of times of dialing of the telephone number is more than the threshold number. However, in the case where the number of times of dialing of the telephone number is not more than the threshold number, or in the case where the user intends to register a telephone number of a calling party, the user has to search the electronic directory memory section 22 and judge whether or not the telephone number has already been registered in the electronic directory memory section 22, before registering the telephone number in the electronic directory memory section 22 using the number keys 24.

In the case where the communication terminal device is a portable cellular phone, the storage capacity of the electronic directory memory section of the portable cellular phone is more limited in comparison with those of tabletop communication terminal device. When many telephone numbers have been registered and the electronic directory memory section is almost full, the need for judging whether or not the telephone number has already been registered becomes essential in order to avoid the repetition of registration of the same telephone number. Further, operation for searching the electronic directory memory section becomes complicated as the number of registered telephone numbers becomes large.

SUMMARY OF THE INVENTION

It is therefore the primary object of the present invention to provide a device and a method for searching directory memory of a portable cellular phone, by which the directory memory of the portable cellular phone is automatically searched, whether or not a telephone number of a party (a person on the other end of the line: a calling party or a receiving party) and corresponding data has already been registered in the directory memory can be judged without operation by the user, and the result can be displayed to the user.

In accordance with a first aspect of the present invention, there is provided a directory memory searching method for a portable cellular phone which is provided with a directory memory means for storing a plurality of telephone numbers and data corresponding to each of the telephone numbers. The directory memory searching method comprises a telephone number temporary memory step, a search step, and a display step. In the telephone number temporary memory step, a telephone number of a party is detected on reception of a call to the portable cellular phone or on calling from the portable cellular phone, and the telephone number of the party is temporarily stored in a telephone number temporary memory means. In the search step, the directory memory means is searched for the telephone number of the party which has been stored in the telephone number temporary memory means, and it is judged whether or not the telephone number of the party has already been registered in the directory memory means. And in the display step, the result of the search step is displayed on a display means.

In accordance with a second aspect of the present invention, in the first aspect, the result of the search step displayed in the display step includes the telephone number of the party and a symbol which indicates whether or not the telephone number has already been registered in the directory memory means.

In accordance with a third aspect of the present invention, in the first aspect, in the case where the user used abbreviated dialing for calling, the whole telephone number before abbreviation is detected and the whole telephone number is stored in the telephone number temporary memory means in the telephone number temporary memory step.

In accordance with a fourth aspect of the present invention, in the first aspect, the display step is executed just after the telephone call is finished.

In accordance with a fifth aspect of the present invention, in the first aspect, the search step and the display step are executed according to an instruction of the user of the portable cellular phone.

In accordance with a sixth aspect of the present invention, in the first aspect, the search step and the display step can also be executed with respect to an arbitrary telephone number that is inputted by the user of the portable cellular phone in other cases than reception and calling.

In accordance with a seventh aspect of the present invention, there is provided a portable cellular phone comprising a radio communication means, an operation means, a directory memory means, a telephone number detection means, a telephone number temporary memory means, a search means, and a display means. The radio communication means executes radio communication with a base station. The operation means lets the user input instructions for operating the portable cellular phone. The directory memory means stores a plurality of telephone numbers and data corresponding to each of the telephone numbers. The telephone number detection means detects a telephone number of a party on reception of a call to the portable cellular phone or on calling from the portable cellular phone. The telephone number temporary memory means temporarily stores the telephone number of the party which has been detected by the telephone number detection means. The search means reads out the telephone number which has been stored in the telephone number temporary memory means, searches the directory memory means for the telephone number, and judges whether or not the telephone number has already been registered in the directory memory means. The display means displays information such as the result of the search and judgment by the search means.

In accordance with an eighth aspect of the present invention, in the seventh aspect, the result of the search and judgment displayed by the display means includes the telephone number of the party and a symbol which indicates whether or not the telephone number has already been registered in the directory memory means.

In accordance with a ninth aspect of the present invention, in the seventh aspect, in the case where the user used abbreviated dialing for calling, the telephone number detection means detects the whole telephone number before abbreviation, and the whole telephone number is stored in the telephone number temporary memory means.

In accordance with a tenth aspect of the present invention, in the seventh aspect, the display means displays the result of the search and judgment by the search means just after the telephone call is finished.

In accordance with an eleventh aspect of the present invention, in the seventh aspect, the search and judgment by the search means and the display of the result by the display means are executed according to an instruction of the user of the portable cellular phone.

In accordance with a twelfth aspect of the present invention, in the seventh aspect, the search and judgment by the search means and the display of the result by the display means can also be executed with respect to an arbitrary telephone number that is inputted by the user of the portable cellular phone in other cases than reception and calling.

BRIEF DESCRIPTION OF THE DRAWINGS

The objects and features of the present invention will become more apparent from the consideration of the following detailed description taken in conjunction with the accompanying drawings, in which:

FIG. 4A is a schematic diagram showing an example of display in the case where a telephone number of a party existed in a directory memory of the portable cellular phone of FIG. 2;

FIG. 4B is a schematic diagram showing an example of display in the case where a telephone number of a party did not existed in the directory memory; and FIG. 5 is a schematic diagram showing an example of a memory map of the directory memory.

DESCRIPTION OF THE PREFERRED EMBODIMENTS

Figure 1:
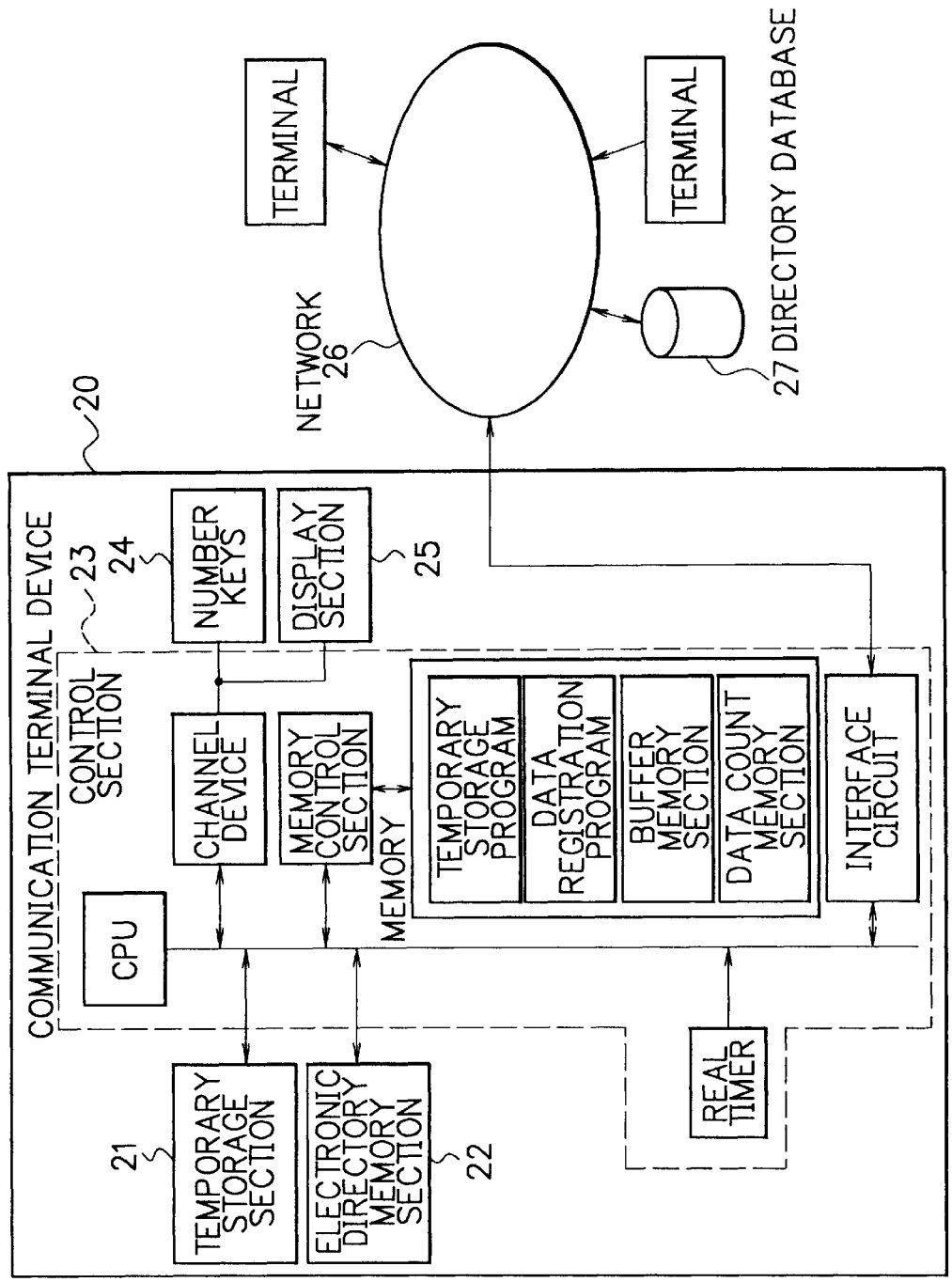
FIG. 1 is a block diagram showing a conventional communication terminal device.

Referring now to the drawings, a description will be given in detail of preferred embodiments in accordance with the present invention.

Figure 2:
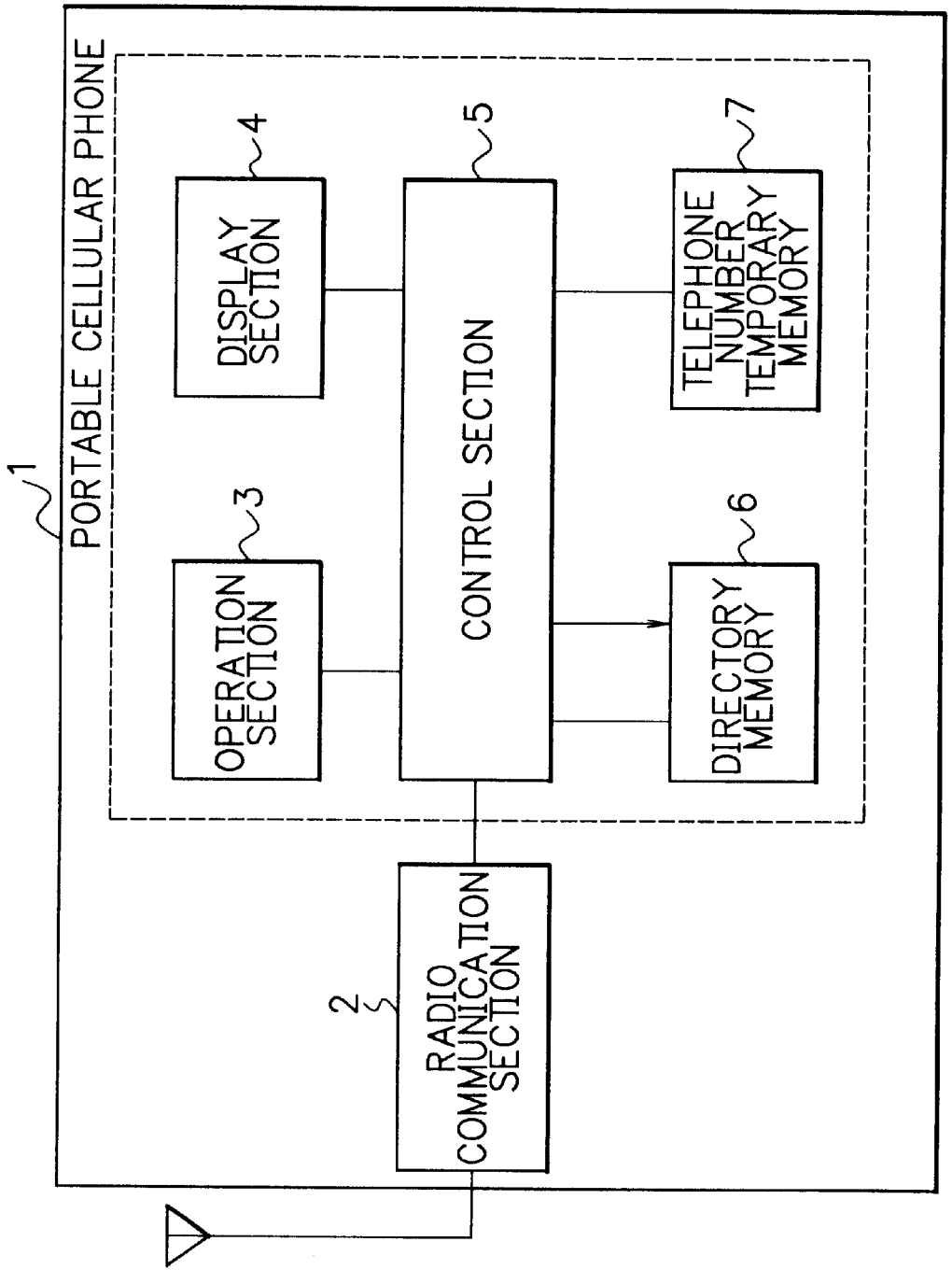
FIG. 2 is a block diagram showing a portable cellular phone according to an embodiment of the present invention.

FIG. 2 is a block diagram showing a portable cellular phone 1 according to an embodiment of the present invention.

Referring to FIG. 2, the portable cellular phone 1 comprises a radio communication section 2 for executing radio communication with a base station, an operation section 3 for letting the user input instructions for operating the portable cellular phone 1, a directory memory 6 in which a plurality of telephone numbers and data corresponding to each of the telephone numbers are stored, a telephone number temporary memory 7 for temporarily storing a telephone number of a party (a person on the other end of the line: a calling party or a receiving party), a control section 5 for searching the directory memory 6 and judging whether or not the telephone number stored in the telephone number temporary memory 7 has already been registered in the directory memory 6 as well as controlling each component of the portable cellular phone 1, a display section 4 having an LCD (Liquid Crystal Display) for displaying information such as the result of the search by the control section 5.

The control section 5 is realized by, for example, a microprocessor unit which is composed of a CPU (Central Processing Unit), ROM (Read Only Memory), RAM (Random Access Memory), etc., and appropriate software. The directory memory 6 and the telephone number temporary memory 7 are realized by, for example, RAM such as SRAM (Static RAM).

Figure 3:
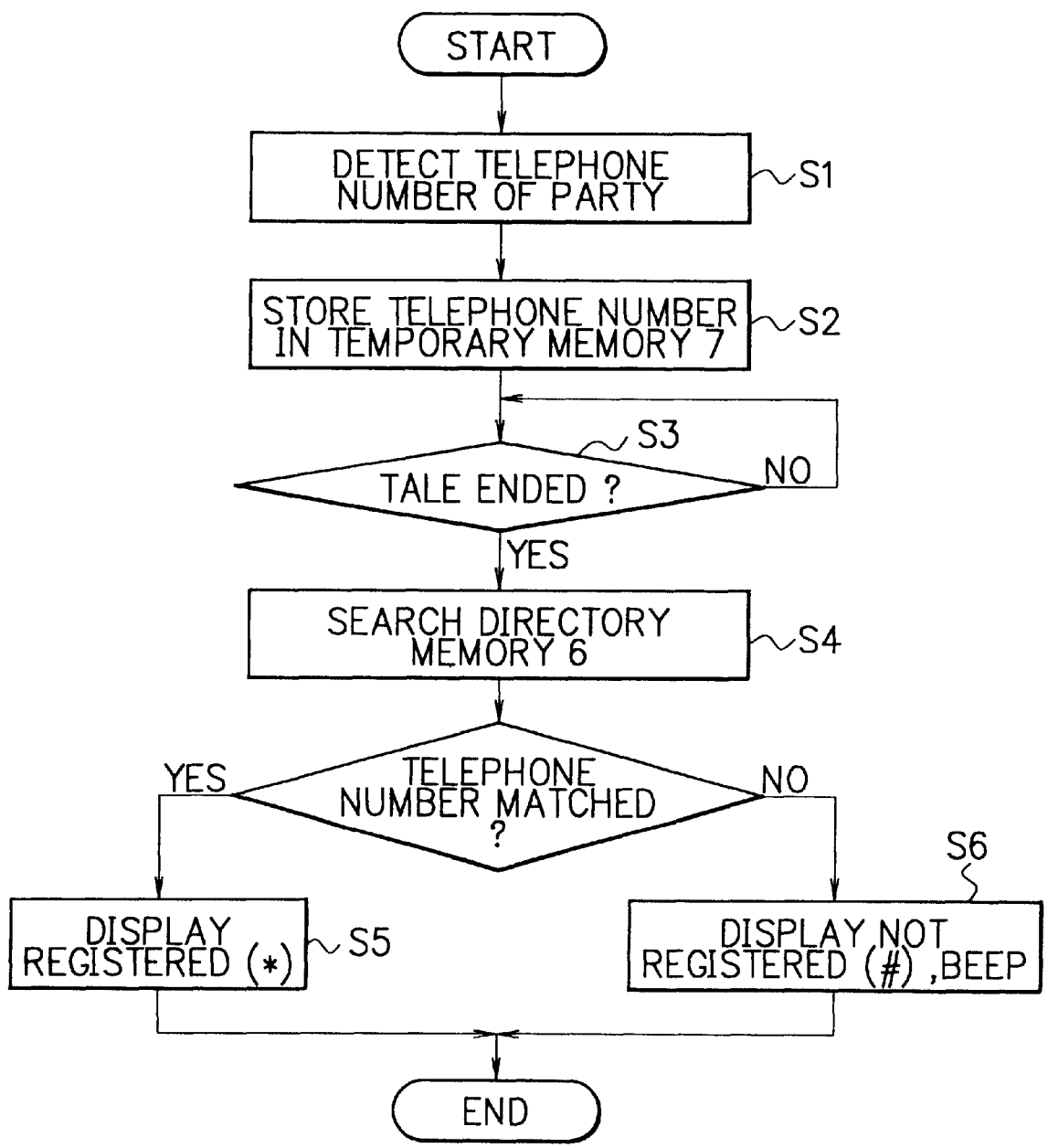
FIG. 3 is a flow chart showing an example of the operation of the portable cellular phone of FIG. 2.

In the following the operation of the portable cellular phone 1 according to the embodiment will be described referring to FIG. 3. FIG. 3 is a flow chart showing an example of the operation of the portable cellular phone 1 of FIG. 2.

When the user of the portable cellular phone 1 dialed a telephone number for calling by pushing number keys of the operation section 3, the control section 5 detects the dialed telephone number and stores the telephone number in the telephone number temporary memory 7. In the case where the user used abbreviated dialing, the control section 5 detects the whole telephone number before abbreviation and stores the telephone number in the telephone number temporary memory 7.

When the portable cellular phone 1 received a call, the control section 5 detects a telephone number of a calling party by means of "calling number identification presentation" etc., and stores the telephone number in the telephone number temporary memory 7 (step S1, step S2).

The control section 5 monitors continuation of talk (continuation of a telephone call which is executed by the radio communication section 2), and when the talk (telephone call) ended (step S3), the control section 5 reads out the telephone number of the party from the telephone number temporary memory 7, and searches the directory memory 6 for the telephone number (step S4).

In the case where the telephone number existed in the directory memory 6, the control section 5 displays the telephone number and a symbol ("*", for example), which indicates that the telephone number has already been registered in the directory memory 6, on the LCD of the display section 4. FIG. 4A shows an example of the display by the display section 4 in this case. On the LCD, the symbol "*" is displayed on the left-hand end of the screen, and a telephone number "0123456789" is displayed next to the symbol, for example (step S5).

In the case where the telephone number did not exist in the directory memory 6, the control section 5 displays the telephone number and a symbol ("#", for example), which indicates that the telephone number has not been registered in the directory memory 6 yet, on the LCD of the display section 4, and makes repeated short beeps from a speaker of the portable cellular phone 1 in order to inform the user that registration of the telephone number has not been done yet. FIG. 4B shows an example of the display by the display section 4 in this case. On the LCD, the symbol "#" is displayed on the left-hand end of the screen, and a telephone number "0123456789" is displayed next to the symbol, for example (step S6).

When the symbol "#" is displayed, the user can newly register the telephone number and corresponding data in the directory memory 6, by operating keys on the operation section 3.

FIG. 5 is a schematic diagram showing an example of a memory map of the directory memory 6. In the directory memory 6, telephone numbers and data corresponding to each of the telephone numbers are stored. The data corresponding to each telephone number includes name, address, and an abbreviated telephone number for abbreviated dialing, for example.

Incidentally, while the process from the step S4 in the above explanation was executed just after the telephone call is ended, it is also possible to let the control section 5 execute the process from the step S4 according to other timing. For example, in the case where the user could not answer the call and recording of a message of the calling party was executed as automatic answering and recording, the process from the step S4 can be executed according to an instruction of the user, such as pushing a search instruction button on the operation section 3. For such operation, it is preferable that the number of telephone numbers stored in the telephone number temporary memory 7 can be set at two or more and the user can arbitrarily determine timing for deleting the telephone numbers stored in the telephone number temporary memory 7.

In addition, while the step S4 in the above explanation was executed after the telephone call is finished, it is also possible to let the control section 5 execute the step S4 (search of the telephone number temporary memory 7) before the telephone call is finished, that is, during conversation. Further, it is also possible to let the control section 5 execute the process from the step S4 for an arbitrary telephone number that is inputted by the user from the number keys of the operation section 3, in other cases than reception and calling.

As described above, in the directory memory searching method and the directory memory searching device for a portable cellular phone according to the embodiment of the present invention, on reception of a call to the portable cellular phone 1 or on calling from the portable cellular phone 1, a telephone number of a party is detected and stored in the telephone number temporary memory 7, it is judged whether or not the telephone number of the party stored in the telephone number temporary memory 7 has already been registered in the directory memory 6, and the result of the judgment is displayed on the display section 4, thereby the user is automatically informed about whether or not the telephone number of the party has already been registered in the directory memory 6. Therefore, the user is released from complicated number key operation for searching the directory memory 6 and judging whether or not the telephone number of the party has already been registered. By this, the repetition of registration of the same telephone number in the directory memory 6 can easily been prevented, and wastage of storage capacity of the directory memory 6 can be avoided.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A directory memory searching method for a portable cellular phone which is provided with a directory memory means for storing a plurality of telephone numbers and data corresponding to each of the telephone numbers, comprising the steps of:

detecting a telephone number of a party on reception of a call to the portable cellular phone and temporarily storing the telephone number of the party in a telephone number temporary memory means;

detecting a telephone number of a party on calling from the portable cellular phone and temporarily storing the telephone number of the party in the telephone number temporary memory means;

searching the directory memory means for the telephone number of the party which has been stored in the telephone number temporary memory means, and judging whether or not the telephone number of the party has already been registered in the directory memory means wherein said telephone numbers searched in the directory means comprise both numbers detected upon receipt of calls and on calls made from the portable cellular phone: and displaying the result of the search step on a display means whether or not the telephone number has already been registered in the directory memory means, wherein the display step is executed just after the telephone call is finished.

2. A directory memory searching method as claimed in claim 1, wherein the result of the search step displayed in the display step includes the telephone number of the party and a symbol which indicates whether or not the telephone number has already been registered in the directory memory means.

3. A directory memory searching method as claimed in claim 1, wherein in the case where the user used abbreviated dialing for calling, the whole telephone number before, abbreviation is detected and the whole telephone number is stored in the telephone number temporary memory means in the telephone number temporary memory step.

4. A directory memory searching method as claimed in claim 1, wherein the search step and the display step are executed according to an instruction of the user of the portable cellular phone.

5. A directory memory searching method as claimed in claim 1, wherein the search step and the display step can also be executed with respect to an arbitrary telephone number that is inputted by the user of the portable cellular phone in other cases than reception and calling.

6. A portable cellular phone comprising:

a radio communication means for executing radio communication with a base station;

an operation means for letting the user input instructions for operating the portable cellular phone;

a directory memory means in which a plurality of telephone numbers and data corresponding to each of the telephone numbers are stored;

means for detecting a telephone number of a party on reception of a call to the portable cellular phone and temporarily storing the telephone number of the party in a telephone number temporary memory means;

means for detecting a telephone number of a party on calling from the portable cellular phone and temporarily storing the telephone number of the party in the telephone number temporary memory means a telephone number temporary memory means for temporarily storing the telephone number of the party which has been detected by the telephone number detection means;

a search means for reading out the telephone number which has been stored in the telephone number temporary memory means, searching the directory memory means for the telephone number, and judging whether or not the telephone number has already been registered in the directory memory means, wherein the searched telephone numbers comprise both numbers detected upon receipt of calls and on calls made from the portable phone; and a display means for displaying the result of the search and judgment by the search means whether or not the telephone number has already been registered in the directory memory means, wherein the display means displays the result of the search and judgment by the search means just after the telephone call is finished.

7. A portable cellular phone as claimed in claim 6, wherein the result of the search and judgment displayed by the display means includes the telephone number of the party and a symbol which indicates whether or not the telephone number has already been registered in the directory memory means.

8. A portable cellular phone as claimed in claim 6, wherein in the case where the user used abbreviated dialing for calling, the telephone number detection means detects the whole telephone number before abbreviation, and the whole telephone number is stored in the telephone number temporary memory means.

9. A portable cellular phone as claimed in claim 6, wherein the search and judgment by the search means and the display of the result by the display means are executed according to an instruction of the user of the portable cellular phone.

10. A portable cellular phone as claimed in claim 6, wherein the search and judgment by the search means and the display of the result by the display means can also be executed with respect to an arbitrary telephone number that is inputted by the user of the portable cellular phone in other cases than reception and calling.

* * * * *